United States Patent [19]
Jordan, III et al.

[11] Patent Number: 5,592,893
[45] Date of Patent: Jan. 14, 1997

[54] SPORT FISHING OUTRIGGER DEVICE

[75] Inventors: Robert T. Jordan, III, Jupiter; Russell G. Mortensen, Palm Beach Gardens, both of Fla.

[73] Assignee: E-Tec Marine Products, Inc., Riviera Beach, Fla.

[21] Appl. No.: 605,328

[22] Filed: Feb. 14, 1996

[51] Int. Cl.⁶ ............................................. B63B 35/14
[52] U.S. Cl. ...................................... 114/255; 114/364
[58] Field of Search ........................... 212/292; 114/255, 114/361, 364; 43/21.2, 43.12; 248/538–541

[56] References Cited

U.S. PATENT DOCUMENTS

| | | | |
|---|---|---|---|
| Re. 12,960 | 5/1909 | Hadley | 212/292 |
| 277,728 | 5/1883 | Hoblit | 212/292 |
| 2,212,384 | 8/1940 | Brandel | 212/292 |
| 3,664,515 | 5/1972 | Orendorff et al. | 212/292 |
| 3,724,791 | 4/1973 | Mason . | |
| 4,384,542 | 5/1983 | Wilson . | |
| 4,993,346 | 2/1991 | Rupp . | |
| 5,140,928 | 8/1992 | Frick . | |
| 5,191,852 | 3/1993 | Rupp . | |
| 5,243,927 | 9/1993 | Messick . | |
| 5,245,780 | 9/1993 | Hansen et al. . | |

*Primary Examiner*—Stephen Avila
*Attorney, Agent, or Firm*—McHale & Slavin, P.A.

[57] ABSTRACT

A sport fishing outrigger assembly with a position adjustment positive locking mechanism capable of indexable adjustment and nonslip positive locking of a rotatably deployable outrigger boom assembly. The mechanism uses a fixably attached (yet replaceable) non-metal split collar with a plurality of castellated, vertically oriented indexing aperture slots. The slots receivable engage a metal locking bar as attached to a handle assembly, the assembly being mounted for pivotal, downward penetration of the bar with the aperture slots. The rotatable boom assembly is further isolated from an containing indexing pipe by a plastic bushing at the top and a plastic bearing at the bottom to prevent metal-on-metal rotation of the wearable parts.

19 Claims, 8 Drawing Sheets

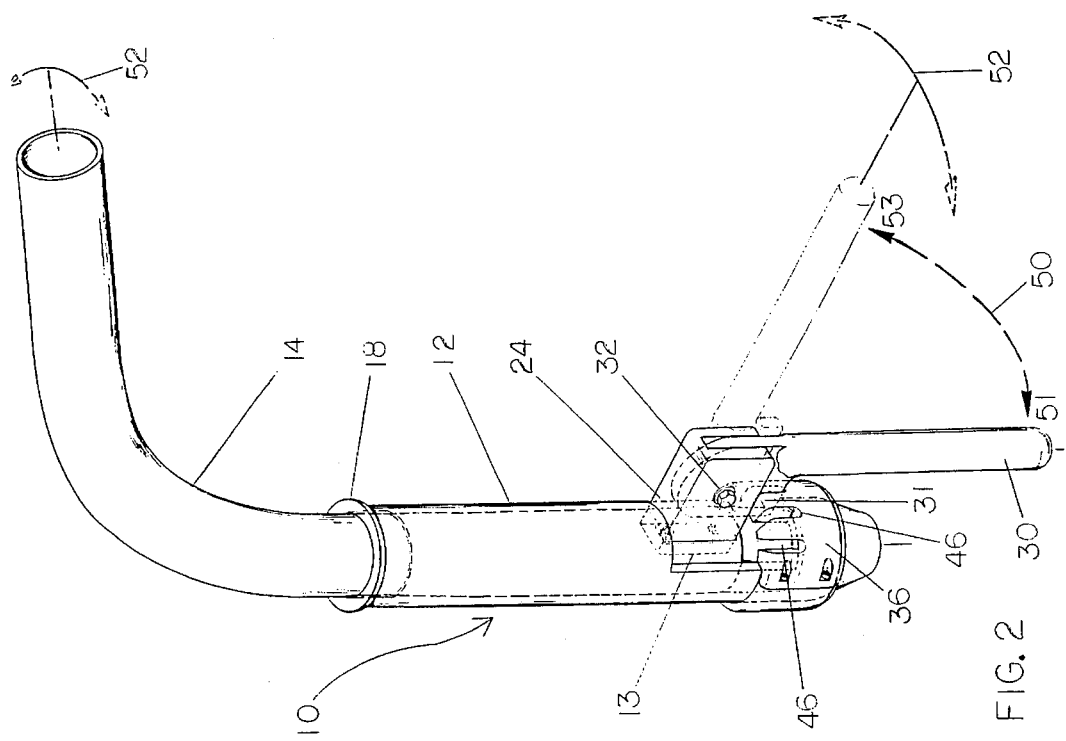
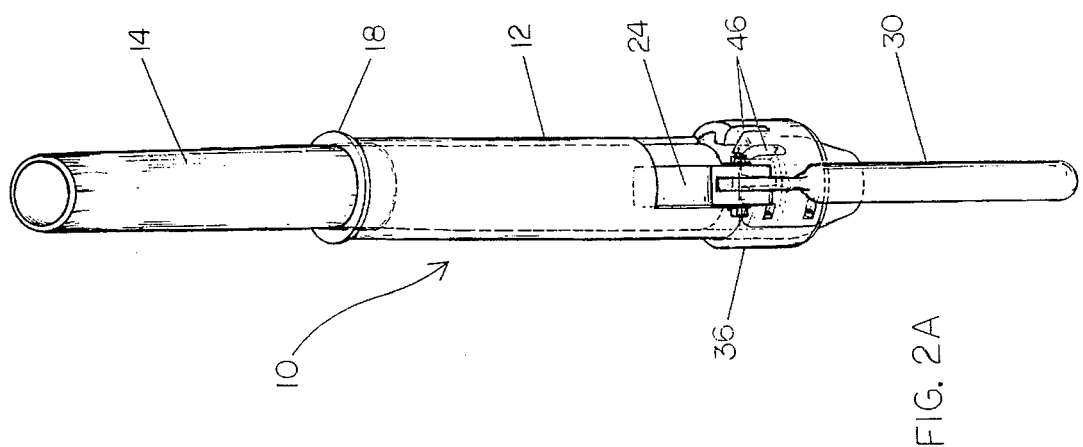

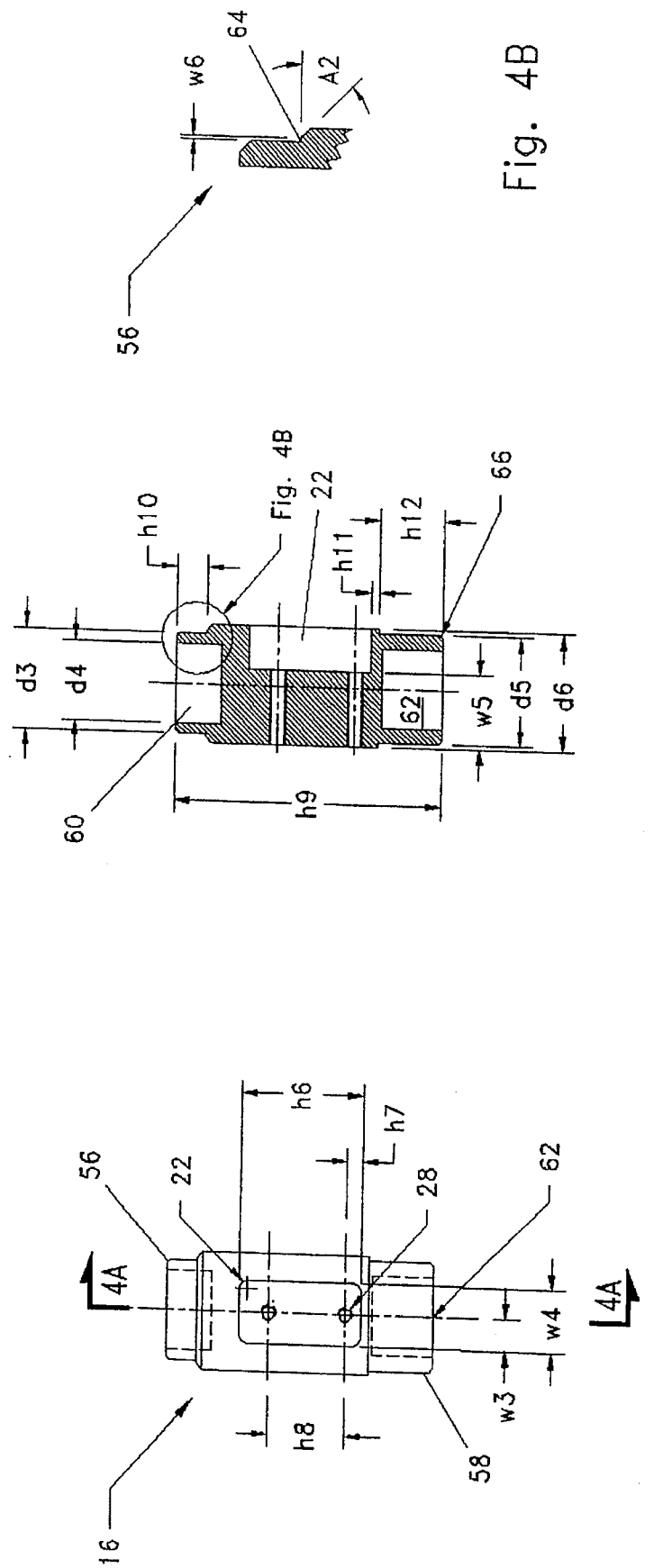

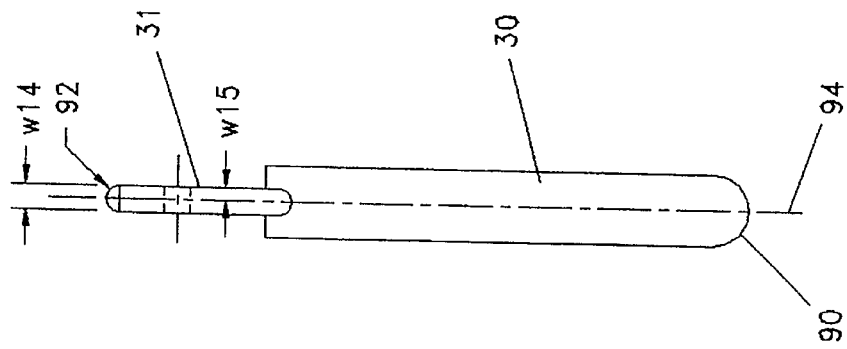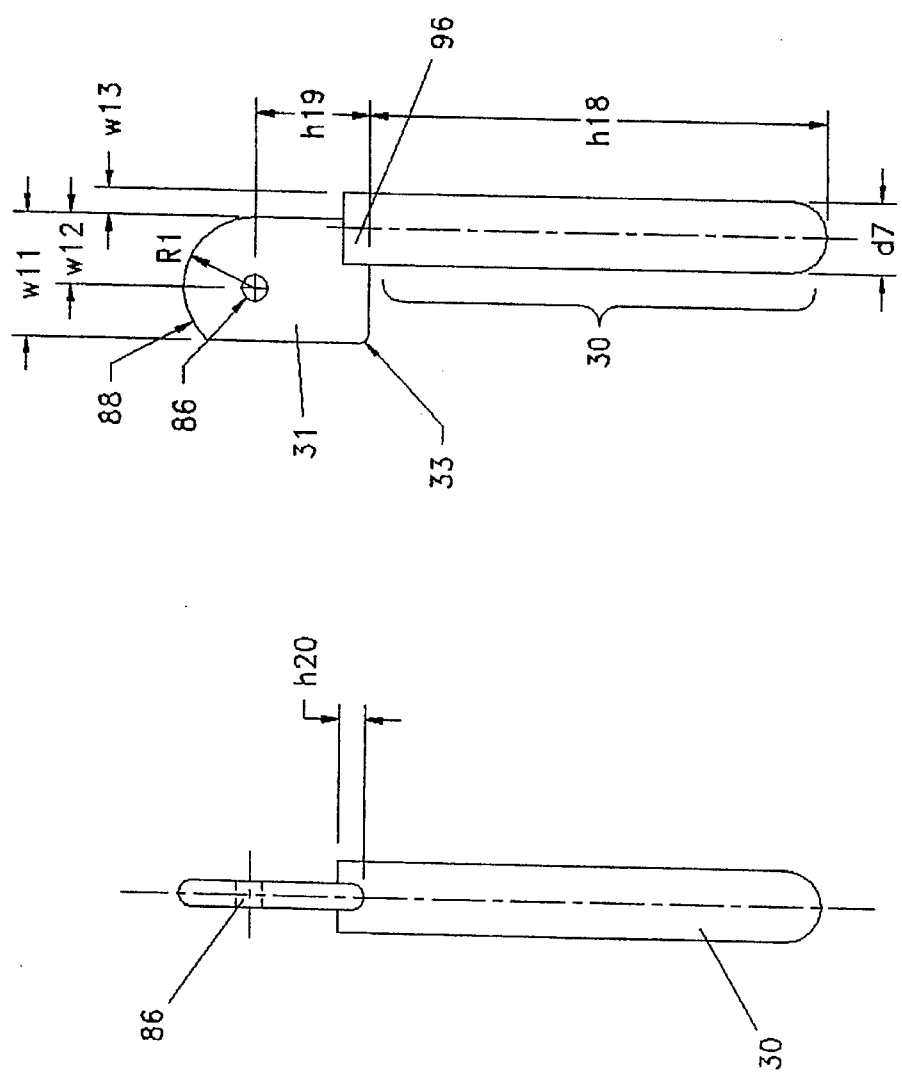

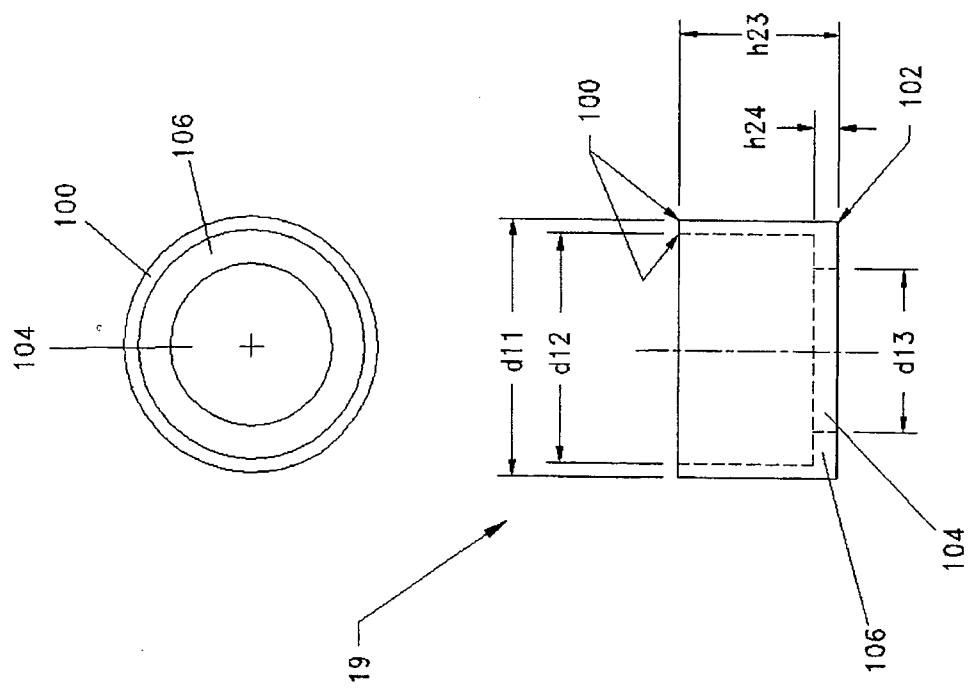
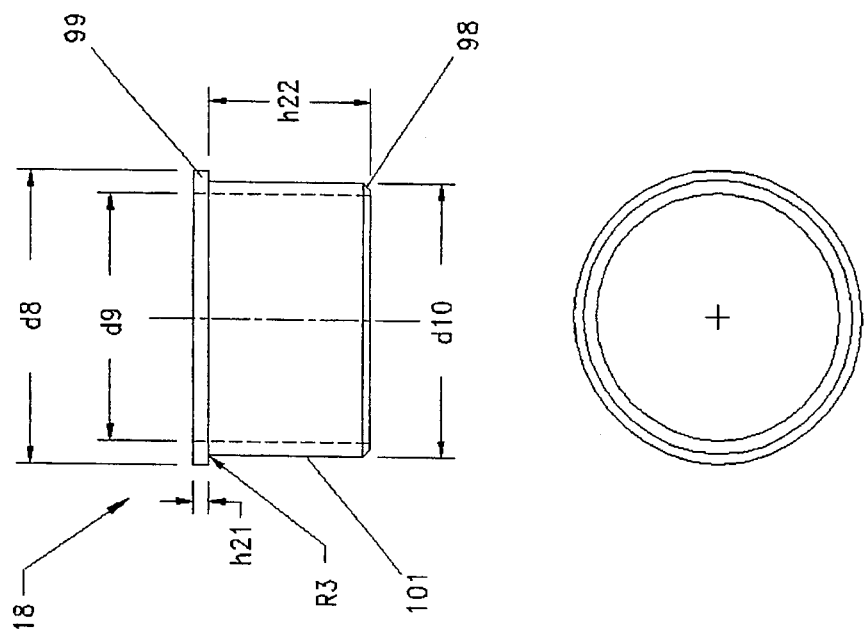
Fig. 8
Fig. 7

SPORT FISHING OUTRIGGER DEVICE

FIELD OF INVENTION

This invention relates to sport fishing and in particular to an outrigger device having an improved adjustment mechanism for precisely indexing and locking of the angular position of an outrigger.

BACKGROUND OF THE INVENTION

Saltwater sport fishing typically consists of placing anglers on boats to reach productive offshore fishing grounds. Sport fishing targets popular saltwater species including striped bass, dolphin, tuna, blue and black marlin, sailfish, grouper, wahoo, and tarpon. A productive method of catching the fish involves a technique known as trolling wherein the angler drags baited hooks approximately thirty yards behind the stern of a slow moving boat. Trolling is the favored method for saltwater big-game fishing which generally requires a boat and equipment capable of withstanding heavy seas and large fish. To increase the chance of hooking a fish, it is an important consideration to have as many lines in the water as possible. In general, the wake of the boat appears, to a gamefish, as a large school of smaller fish. With a multitude of baited lines, the fisherman can strategically simulate bands of straggling or displaced fish from the school. These stragglers are the weaker fish that gamefish typically prey upon.

Hence, the fisherman would ideally like to drag as many lines as possible behind the boat to increase the chances of a strike. However, the more lines that are used, the more the chance of the lines becoming tangled with each other. This is particularly true of a narrow beam boat or when the boat is being turned. As a result, sport fishing outriggers have been developed to assist in keeping the various lines separated.

An outrigger consists of a long boom, or pole, which is attached to the boat in various manners and is deployed to extend laterally outwards from the boat. Baited fishing lines, with release clips, are attached to the outriggers and thereby provide enough separation between the lines to prevent tangling. When a fish strikes the bait, the line clip releases from the outrigger and the fisherman reels in the fish.

By law (and practicality), outriggers must be freely stowable to a folded position along-side the boat for close water operation and docking. For practical operation, the outrigger must necessarily be swung laterally outward to its deployed position. The prior art, not necessarily patented, but used for many years in the field, includes all types of mounting schemes including outrigger units for horizontal and vertical mounting, on center consoles, flybridges, half towers, tuna towers, radar arches, and/or T-tops. Prior patents disclose a variety of methods for mounting, deploying, and locking into place such outriggers (see e.g. U.S. Pat. Nos. 3,724,791; 4,384,542; 4,993,346; 5,140,928; 5,191,852; 5,243,927; and 5,245,780), with each having distinct drawbacks. Such drawbacks include overall mechanical complexity; powered operation; non-durable metal-on-metal construction; and/or ineffective position adjustment and locking mechanisms which slip and/or wear out, especially due to metal-on-metal construction.

U.S. Pat. No. 3,724,791 discloses a pivotally mounted bracket with a tubular socket, wherein the device is locked into place via a spring-loaded metal indexing pin which penetrates holes in metal disc portion.

U.S. Pat. No. 4,384,542 discloses a complex system of brackets with collapsible support members and a slidable connection for achieving pivotal movement of the tubular member about multiple axes.

U.S. Pat. No. 4,993,346 discloses an outrigger device extending through a T-top, in a manner commonly practiced by fishermen using outriggers on boats with a T-top weldment. The disclosed outrigger rotates via metal-on-metal construction which causes corrosion and galling of the aluminum parts. The device also discloses, for rotating and locking the device into place, a locking means consisting of a metal compression ring which clamps down upon a metal tubular member via a camming action. A problem with this teaching is the metal-on-metal construction which results in galling and corrosion, which eventually results in seizure of the components. Alternatively, this locking means includes a spring-loaded metal pin which penetrates holes drilled in the tubular member. In either event, the metal-on-metal construction (especially with dissimilar metals such as stainless steel and aluminum) will eventually lead to stretching and widening of the penetrated holes, thus rendering the locking device useless for its intended purpose.

U.S. Pat. No. 5,140,928 discloses a complex electro-hydraulic mechanism with a helm-mounted joystick control system for independent movement of each outrigger boom.

U.S. Pat. No. 5,191,852 discloses a tubular outrigger device which is locked into place via sliding movement of a collar along an elongated tube, with a levered cam member for controlling compression of the slidable collar.

U.S. Pat. No. 5,243,927 discloses a tubular housing with a hydraulically driven piston for positioning the attached outrigger.

U.S. Pat. No. 5,245,780 discloses an outrigger with variable length strut members to change the position of the outrigger device.

While the prior art discloses a wide variety of mechanisms and mounting locations, the prior art fails to disclose or teach a simple, yet durable, outrigger with an effective locking means. This is particularly true in light of the excessive movement experienced by an extended outrigger in operation. A 10–30 foot boom will be affected by both wind and movement of the boat which causes incessant back-and-forth stresses at the outrigger's mount. In general, the longer the boom, the higher the stresses at the mount. The stresses from such tenacious movement will undoubtedly cause excessive wear on a poorly designed mount, often to the point of failure. If the position adjustment and locking mechanism were to fail, the outrigger might freely swing out during a critical maneuver or operation, with possibly disastrous or life-threatening effects to passengers on board the outrigger equipped boat or surrounding vessels.

Hence, the metal-on-metal devices disclosed thus far produce excessive wear and galling of the aluminum parts. This galling will resulting in a black oxidation which soils surrounding parts of the boat when the outrigger is washed down. To reduce the friction caused by such contact, a lubricant can be used between the metals. However, with the '346 disclosure in particular, such lubrication would work against the compressed ring holding friction necessary for locking the outrigger in place.

Accordingly, an outrigger device with a position adjustment and locking mechanism are needed which avoids these various problems and provides a durable, effective construction which can tolerate the high demands of marine conditions and the rigors of sport fishing.

SUMMARY OF THE INVENTION

The present invention is an outrigger assembly with a position adjustment and locking mechanism, with the assembly intended for mounting and use on all types of boats and related support structures. The assembly incorporates a tubular outer member which is open at the top and tapered at the bottom, and resembles a rod holder as commonly found in the sport fishing industry. The position adjustment and locking mechanism uses a central pivot core element which is rotatably contained within the tubular outer member, or indexing pipe. The central pivot core uses a specially designed plastic endcap fitted over its lower end to prevent metal-on-metal contact with the outer member. This endcap serves as a radial and bottom pivot bearing. The upper end of the central core is fitted with a tube which extends out from the top of the outer tubular member, wherein the top is fitted with a plastic sleeve, or pivot bushing, to again prevent metal-on-metal contact between the rotating parts. A bifurcated plastic collar, with a series of castellated indexing slots, is fixedly attached to the bottom of the outer member. A plastic mounting bracket for a rotating handle is attached to the central core and extends from a vertically elongated window aperture in the indexing pipe. A dual function handle is then rotated downward, when positioned over an appropriate castellated slot, to cause a block-like edge to penetrate and engage the slot, thereby positive locking the outrigger into place. The handle mounting bracket might include an interference contact with the handle to provide positive resistance towards unlocking the device.

The instant invention eliminates metal-to-metal contact between components allowing the use of similar or dissimilar metals without electrolysis. The plastic indexing collar provides precise control over the outrigger's positioning by receiving the block-like edge of the locking means handle. The plastic-on-metal locking of the outrigger is more resilient and durable against stresses imposed by movement of the outrigger boom due to wind and boat action. However, in the event that the slots of the collar become worn, the bifurcated parts can be easily removed and replaced.

Accordingly, it is an objective of the present invention to disclose a rotatable outrigger, for vertical mounting in any location, which has durable non metal-on-metal fittings and a highly effective locking means.

It is a related objective of this invention to provide an outrigger employing a locking means with positive, non-slip indexing and locking.

It is still a further objective of this invention to provide precise indexing position adjustment and locking mechanism wherein deployment positions can be easily located, positive locked, and repeated.

It is yet a further objective of this invention to provide a corrosion resistant, and similar or dissimilar metal corrosion resistant, outrigger assembly, Another related objective of the present invention is to provide a non-galling positive locking feature.

Still another objective of the present invention is to provide a replaceable, non-metal indexing collar which can be easily serviced or replaced if wear or damage should occur.

Other objectives and advantages of this invention will become apparent from the following description taken in conjunction with the accompanying drawings wherein set forth, by way of illustration and example, are certain embodiments of this invention. The drawings constitute a part of this specification and include exemplary embodiments of the present invention and illustrate various objects and features thereof.

BRIEF DESCRIPTION OF THE DRAWINGS

FIG. 2 shows a pictorial view of the assembled outrigger device with the position adjustment locking mechanism shown engaged and disengaged to allow movement of the outrigger.

FIG. 2A shows a front pictorial view of the assembled outrigger device with the position adjustment locking mechanism engaged.

FIG. 4 shows a front view of central pivot core of the outrigger position adjustment locking mechanism.

FIG. 4A shows a cross-sectional view of the central pivot core of FIG. 4 along cut A—A.

FIG. 4B shows a cross-sectional view of a portion of the top of the central pivot core.

FIG. 6 shows a side view of the handle/locking bar of the outrigger position adjustment locking mechanism.

FIG. 6A shows a front view of the handle/locking bar of FIG. 6.

FIG. 6B shows a rear view of the handle/locking bar of FIG. 6.

FIG. 7 shows the orthagonal bottom and side views of upper plastic pivot bushing of FIG. 1A.

FIG. 8 shows the orthagonal top and side views of lower plastic pivot bearing of FIG. 1A.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figures 1, 1A:
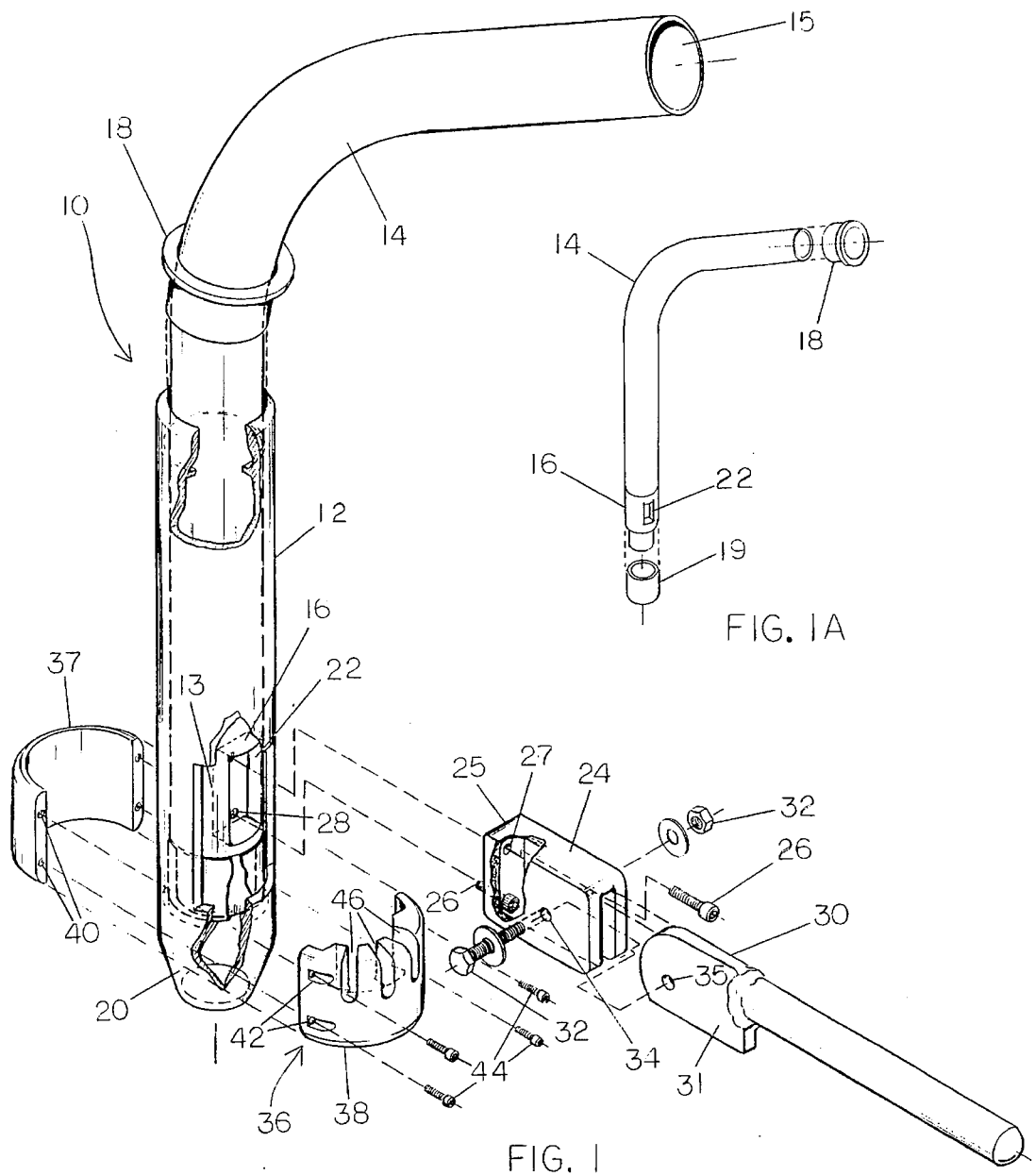
FIG. 1 shows an exploded pictorial view of the outrigger assembly and position adjustment locking mechanism.
FIG. 1A shows an pictorial view of the isolated outrigger extension tube of FIG. 1 with the upper bushing and lower bearing plastic inserts being applied.

Referring now to FIG. 1, the outrigger assembly 10 is shown with the position adjustment locking mechanism exploded apart to show the interaction of the component parts. As shown in FIG. 1A, an inner assembly as comprised of an extension tube 14 is shown mounted to the top of the central pivot core 16. These metal parts are preferably welded together, with the weldment later polished to a mirror finish. An outrigger boom (not shown) is then mounted into the open end 15 of tube 14. Note that the edges of end 15 are beveled slightly to aid in insertion and removal of such outrigger booms. A plastic pivoting bushing 18 is inserted over tube 14 and a bottom plastic pivot bearing 19 is inserted on the bottom on the central pivot core 16. This inner assembly is then inserted into the indexing pipe 12, wherein a pipe adapter 20 has been welded to the bottom of pipe 12. Pipe adapter 20 is used as a load bearing mounting fixture for receiving a supporting pipe, for mounting, in its bottom end. Together the parts of the inner assembly act essentially as a boom holding assembly.

A plastic (or non-metal composite) mounting bracket 24 is fixably mounted into central pivot core 16 via fitting its attachment end 25 into cavity 22 of pivot core 16. This is accomplished by aligning cavity 22 with the vertically elongated window aperture 13 near the bottom of indexing pipe 12. Cavity 22 is formed deep enough to assure secure attachment of the bracket 24. The bracket 24 is attached with machine screws 26 penetrate mounting holes 27, and which are received by threaded holes 28 in cavity 22. A handle locking engagement assembly is comprised of a handle 30 with an end distal and proximal to the user's hand, with a locking bar extension 31 weldably attached to a cavity in the distal end of the handle. The assembly is then mounted into bracket 24 by inserting a self-locking nut, bolt, and washers combination 32 through the hole 34 of the mounting bracket 24 as aligned with the hole 35 of the handle/locking bar 30, 31. Due to the relative flexibility of the plastic bracket 24, the frictional tightness of the mounted handle 30 can be adjusted via the tightness of the self-locking nut and bolt combination 32.

Finally, the position adjustment positive locking mechanism includes a split plastic (or composite) indexing collar 36 consisting of semicircular halves 37 and 38. The rear half 37 includes four threaded screw holes 40 and the front half 38 includes corresponding screw holes 42, wherein screws 44 are used to fixedly attach the collar 36 around the lower portion of the indexing pipe 12. The front half 38 of the collar 36 contains a series of vertical slots 46, which together form a castellated surface on the upper part of collar half 38. The collar 36 is mounted so that span of vertical slots 46 is generally centered over the lower portion of the aperture 13. Collar 36 is also mounted so that the lowermost extension of the slots 46 generally aligns with the lower edge of aperture window 13. A locking bar 31 on handle 30 extends downwards a sufficient amount to penetrate the slots 46 to positive lock the outrigger 10 in place.

Referring now to FIGS. 2 and 2A, the assembled outrigger 10 is shown in operation. As shown by arrows 50, the mounted handle 30 pivots along the axis formed by the bolt, washers and self-locking nut 32 to a positive locked 51 and unlocked 53 position. When in the positive locked position 51, the locking bar 31 is aligned with and penetrates a slot 46. The locking bar 31 is generally the same width as the corresponding slots to provide a snug fit. When in the unlocked position 53, the mechanism is free to deploy the attached extension tube 14 along the arc of positions shown by arrows 52. The range of this arc is generally defined by the width of the elongated window aperture 13 in indexing pipe 12. Similarly, the number of castellated slots 46 as included on the collar 36 determines the range of possible indexed positions.

Figure 3A:
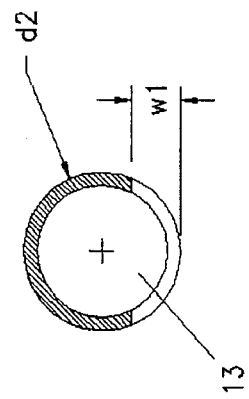
FIG. 3A shows a cross-sectional view of FIG. 3 along cut A—A.
Figure 3:
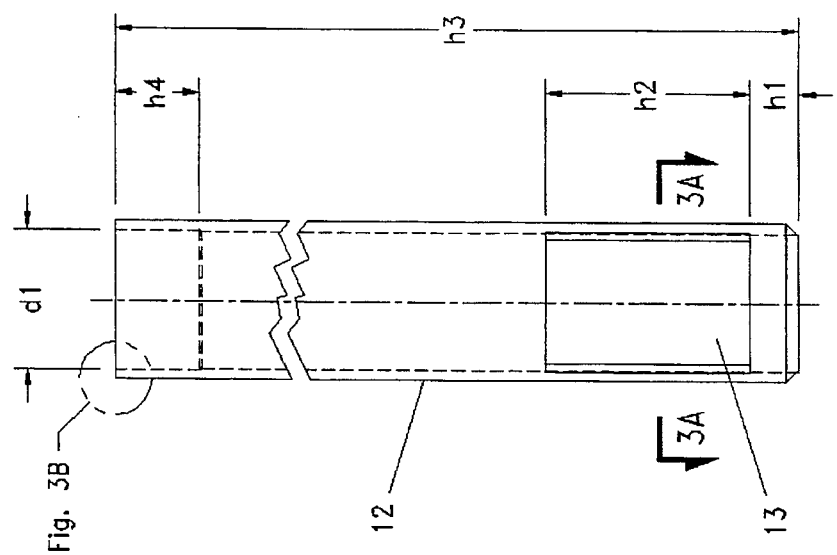
FIG. 3 shows a frontal view of the indexing tube of the outrigger assembly.
Figure 3B:
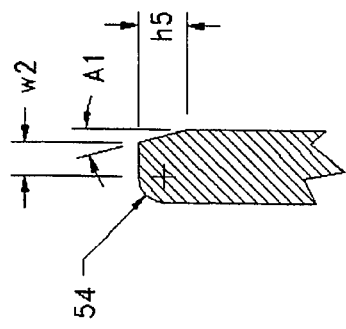
FIG. 3B shows an enlarged cross-sectional view of a portion of the upper lip of the indexing tube of FIG. 3.

Referring now to FIGS. 3, 3A, and 3B, a detailed view of the embodied indexing pipe 12 is shown. This tubular pipe, as constructed from aluminum, and has an inner diameter d1, an outer diameter d2, and a height h3. The aperture 13 extends a width slightly less than the distance of diameter d1 across the front of the pipe 12. The aperture 13 is locate a height h1 above the bottom of pipe 12 and extends another height h2 above h1. When inserted in the top, the bushing 18 (not shown) extends a distance h4 into the pipe 12. As shown in the cross-sectional view A—A in FIG. 3A, the aperture 13 extends a width w1 into the front of pipe 12. Given the circularity of the pipe, width w1 generally determines the size of the aperture 12. FIG. 3B details the bevel along the top of indexing pipe 12 for receiving the bushing 18 (not shown). This bevel generally has a depth h5, a width w2, with the bevel at angle a1 and edge 54 with a radius.

The embodied invention is intended to include any such measurements as can be used to practice this invention by those skilled in the art. The embodiment shown for this part uses the measurements consisting of: d1=2.100 inches; d2=2.375 inches; h1=0.725 inches; h2=3.100 inches; h3=11 inches; h4=1.25 inches; h5=1/16–3/32 inches; w1=0.750 inches; w2=1/16 inches; and a1=15 degrees (such measurements include tolerances of +/−5 degrees for angles, +/−1/32 to 1/8 for fractions, +/−0.005 for three place decimals, and +/−0.02 for two place decimals).

Referring now to FIGS. 4, 4A, and 4B, the embodied central pivot core 16 is shown in front and cross-sectional views. The core 16 has an upper flange 56 which is constructed to receive the lower portion of the extension tube 14 (see FIG. 1A). The upper flange extends downward a height h10 and has a diameter d3. An inner circular cavity 60 with a diameter d4 is included to reduce the overall weight of the part and to facilitate mounting of the extension tube 14. Referring now to FIG. 4B, is shown to have a ridge 64, h10 from the top of core 16, with a width w6. Below the ridge 64, a bevel with angle a2 is formed. The core 16 also has a lower flange 58 which is constructed to receive the lower pivot bearing 19 (see FIG. 1A). The lower flange extends upwards a height h12 with an outer diameter d5, wherein d5 is slightly less than the diameter d6 of the core. A circular cavity 62 is similarly included, with a chamfer 66 on both upper and lower flange ends.

Cavity 22 for receiving the mounting end of the mounting bracket 24 (see FIG. 1) is oriented a height h11 above the end of flange 58. The elongated, rectangular cavity 22 extends upwards a height h6 and has a width w4 and depth equal to (d6−w5). The pair of screw holes 28 are drilled perpendicular to longitudinal axis 62, at a width w3 from the edge of cavity 22, with the first hole h7 above the bottom and the second hole h8 above the first hole.

Again, the embodied invention is intended to include any such measurements as can be used to practice this invention by those skilled in the art. The embodiment shown for this part uses the measurements consisting of: d3=1.605 inches; d4=1.25 inches; d5=1.752 inches; d6=1.90 inches; h6=2.003 inches; h7=0.250 inches; h8=1.265 inches; h9=4 3/8 inches; h10=1/2 inches; h11=0.125 inches; h12=1.060 inches; w3=0.501 inches; w4=1.002 inches; w5=1.19 inches; w6=1/32 inches; and a2=45 degrees (such measurements include tolerances of +/−5 degrees for angles, +/−1/16 for fractions, +/−0.005 for three place decimals, and +/−0.030 for two place decimals).

Figure 5A:
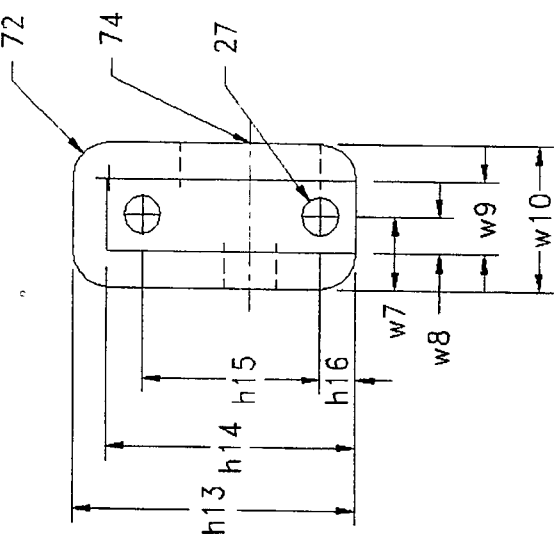
FIG. 5A shows a front view of the handle/locking bar mounting bracket of FIG. 5.
Figure 5:
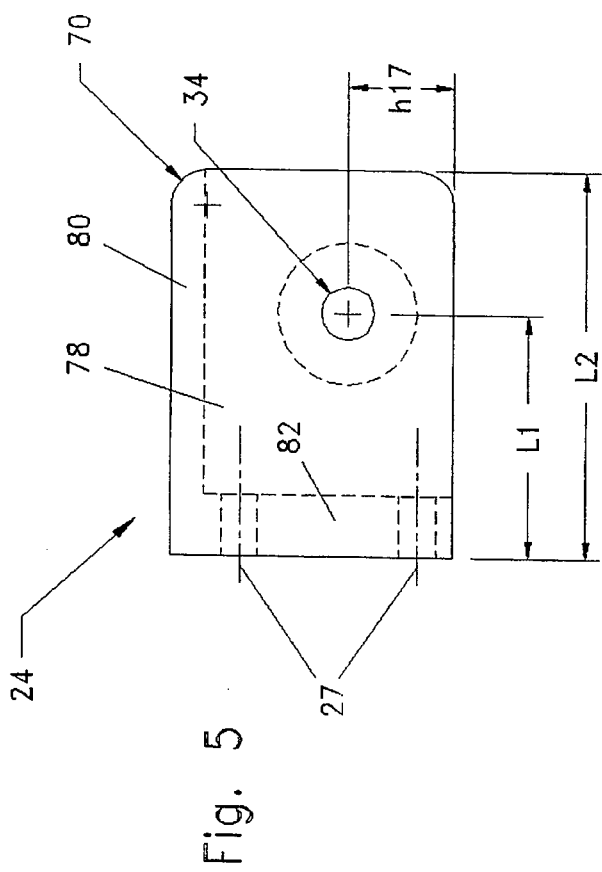
FIG. 5 shows a side view of the handle/locking bar mounting bracket of the position adjustment locking mechanism.
Figure 5B:
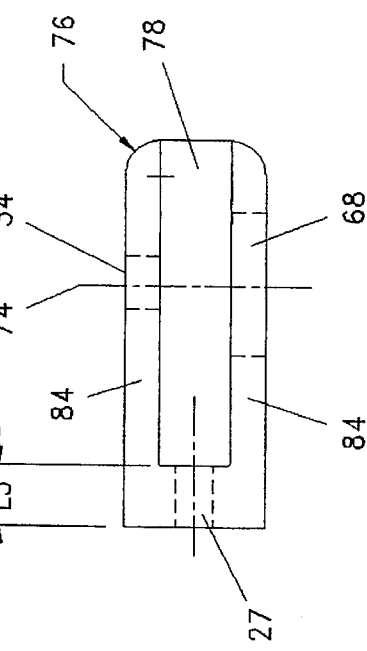
FIG. 5B shows a bottom view of the handle/locking bar bracket of FIG. 5.

Referring now to FIGS. 5, 5A, and 5B, side, bottom, and front views of the mounting bracket 24 for the handle are shown. This non-metal, block-like bracket is constructed to be mounted into the cavity 22 on the pivot core 16 and to pivotally contain the handle 30 (see FIG. 1). The bracket 24 has a length L2, a height h13, and a width w10. The bolt mounting hole 34 along axis 74 and is located a height h17 from the bottom and a length L1 from the left edge. A cavity 78 of height h14 and width w9 exists in the center of the bracket for receiving the handle 30. The side view of the Cavity 78 is bounded at the top by wall 80 and on the left by wall 82 of width L3, wherein wall 82 contains a pair of screw holes 27 located h15 apart, w7 from the side of the bracket, and w8 from the side of the cavity 78, with the bottom hole being h16 from the bottom. The inner surface of upper wall 80 has been machined with a radius 73 for added strength. The bottom and front views of the bracket show the cavity 78 as bounded by walls 84. Alternatively hole 68 is the same diameter as hole 34, with the nut/bolt/washer combination 32 (see FIG. 1) pinching the mounted handle 30 inside the bracket 24. To facilitate mounting the formed part 24 in the pivot core, the area bounded within 71 is radiused on both sides at 1/8 inch.

Once again, the embodied invention is intended to include any such measurements as can be used to practice this invention by those skilled in the art. The embodiment shown for this part uses the measurements consisting of: L1=1.500 inches; L2=2½ inches; L3=0.375 inches; h13=2.000 inches; h14=1.765 inches; h15=1.265 inches; h16=0.250 inches; h17=0.750 inches; w7=0.500 inches; w8=0.188 inches; w9=0.375 inches; w10=1.000 inches; and the diameter of hole 34=0.376 inches (such measurements include tolerances of +/−5 degrees for angles, +/−1/16 for fractions, +/−0.005 for three place decimals, and +/−0.010 for two place decimals).

Referring now to FIGS. 6, 6A, and 6B, the handle 30 with locking bar 31 is shown in side, front, and back views. This metal handle is preferably formed from aluminum, with the larger measurements shown reflecting such a handle. Alternatively, a stainless steel handle might be used with smaller dimensions, but is more costly to manufacture. The embodied handle 30 has a diameter d7. Generally, the locking bar 31 and the handle 30 are independently formed and welded along their connection 94. As shown, the locking bar 31 mounts to the handle 30 at a height h18 due to a cavity 96 (not shown) in the distal end of the handle for receiving the locking bar 31. Hence, the locking bar 31 extends a distance h20 down into the handle cavity. This arrangement adds to the structural integrity of the welded parts. The locking bar structure 31 has a curved frontal edge 88 with radius R1, with a side width w11, a frontal width w14, wherein the bar 31 runs along longitudinal axis 94 as located w15 from the locking bar side. Additionally, locking bar 31 is offset a width w13 from the side view edge of the handle 30. A through hole 86 is located a height h19, and a width w12, from the edge of the locking bar mounting cavity 96.

This through hole corresponds with the mounting holes 34 (and 68) in the mounting bracket 24 (see FIG. 1). Accordingly, the upper curved edge 88 can be of a sufficient radius R1 to cause positive interference contact with the upper wall 80 of the cavity 78 on the mounting bracket 24 (see FIGS. 5, 5A, 5B). This interference contact will provide a stiff resistance to the handle 30 when it is moved downward to position 51 (see FIG. 2) which will help hold the handle in its positive locked position. Alternatively, the radius R1 can be small enough to allow free pivoting of the locking bar 31, with frictional resistance being supplied more so from tightening of the bolt, washer and nut combination 32 (see FIG. 1). Either arrangement will sufficiently assure non-slip positive locking of the locking bar 31 in the receiving aperture slot 46 of the collar 36. Additionally, the handle surface 90 is rounded, with the length of the handle being possibly brushed or textured for gripping. To additionally aid in the operation of the locking bar 31, the surface 92 is rounded for contact against the upper wall 80, and the edge 33 of the locking bar 31 is tapered.

As before, the embodied invention is intended to include any such measurements as can be used to practice this invention by those skilled in the art. The embodiment shown for this part uses the measurements consisting of: h18=6½ inches; h19=1.625 inches; h20=3/8 +/−1/32 inches; w11=1.750 inches; w12=1.000 inches; w13=3/16 inches; w14=0.354 inches; w15=0.19; R1=1.000 inches; the diameter of hole 86=0.375 +/−0.002 inches; and the radius of surface 92=3/16 (such measurements include tolerances of +/−5 degrees for angles, +/−1/16 for fractions, +/−0.010 for three place decimals, and +/−0.030 for two place decimals).

Referring now to FIG. 7, the upper plastic bushing 18 is shown from side and bottom views. This bushing is construction so as to slip over the extension tube 14 (see FIGS. 1, 1A) and securely fit onto the top of the indexing pipe 12. Accordingly, bushing 18 provides a barrier between the indexing pipe 12 and the extension tube 14 to prevent metal-on-metal contact and wearing of the rotating parts. As embodied, bushing 18 has an upper diameter d8 and a lower diameter d10. The hollow part has a circular inner cavity with diameter d9. The part of the bushing 101 which inserts into the indexing pipe extends downward a height h22, and the upper lip 99 extends upwards a height h21. Additionally, the lip 99 carries a radius R3 at its intersection with the lower part 101.

As before, the embodied invention is intended to include any such measurements as can be used to practice this invention by those skilled in the art. The embodiment shown for this part uses the measurements consisting of: h21=1/8 inches; h22=1¼ inches; d8=2¼ inches; d9=1.900 inches; d10=2.100 inches; R3=1/64 inches; and the surface 98 chamfered 0.06 inches at 45 degrees (such measurements include tolerances of +/−5 degrees for angles, +/−1/32 for fractions, +/−0.015 for three place decimals, and +/−0.030 for two place decimals).

Referring now to FIG. 8, side and top views of the plastic lower pivot bearing 19 are shown. This cap-like bearing is constructed so as to fit over the bottom flange 58 of the central pivot core 16 (see FIGS. 1A and 4). Installation of the bearing 19 prevents metal-on-metal contact of the central pivot core 16 with the bottom of the indexing pipe 12 and pipe adaptor 20. As embodied, the bearing has height h23, an outer diameter d11, and a central cavity with diameter d13. The bottom end 106, having height h24, has a centralized through hole 104 of diameter d13.

Once again, the embodied invention is intended to include any such measurements as can be used to practice this invention by those skilled in the art. The embodiment shown for this part uses the measurements consisting of: h23=1.250 inches; h24=0.200 inches; d11=1.965 inches; d12=1.750 inches; d13=1¼ inches; with surfaces 102 being chamfered 1/64 inches at 45 degrees, and surfaces 100 having a break on the edges of 0.005/0.010 inches at 45 degrees (such measurements include tolerances of +/−5 degrees for angles, +/−1/8 for fractions, +/−0.005 for three place decimals, and +/−0.020 for two place decimals).

Figure 9:
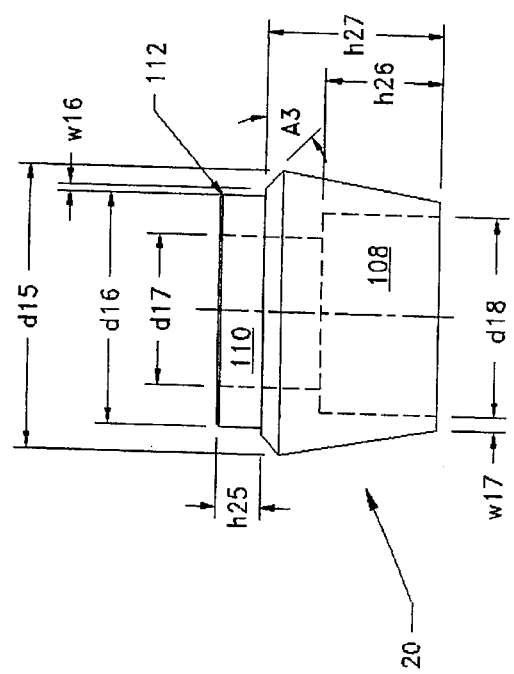
FIG. 9 shows a side view of the pipe adapter for the outer tubular member of FIG. 3.

Referring now to FIG. 9, a side view of the pipe adapter 20 is shown. The pipe adapter is constructed so as to be inserted and welded into the bottom of the indexing pipe 12. The purpose of this adapter is to receive, within cavity 108, a mounting pipe (not shown) which is structurally attached to the boat. This makes for a stronger mount because any load stresses are transferred down through this mounting pipe. This alleviates stresses from any welds made to the side of the indexing pipe in order to mount the outrigger assembly to the boat structure. As embodied, the adapter has an upper portion 110, with height h25 and diameter d16, which is inserted into the bottom of the indexing pipe 12. The adapter then has a slight ridge, h27 from its bottom with width w16, and then bevels outward and downward at angle A3 to a maximum diameter of d15. The central portion of the adapter 20 is hollow with a diameter d17. The pipe receiving cavity 108 extends upwards a height h26, with a diameter d18, and forming a width w17 of the lowermost walls of the adapter.

Similarly, the embodied invention is intended to include any such measurements as can be used to practice this invention by those skilled in the art. The embodiment shown for this part uses the measurements consisting of: h25=0.373 inches; h26-1 inches; h27=1½ inches; d15=2⅜ inches; d16=1.970 inches; d17=1¼ inches; A3=45 degrees; d18 can vary with desired mounting pipe size, e.g. 1.660 inches or 1.900 inches; and surfaces 112 being chamfered 0.02 inches at 45 degrees (such measurements include tolerances of +/−5 degrees for angles, +/−1/16 for fractions, +/−0.010 for three place decimals, and +/−0.020 for two place decimals).

Figure 10A:
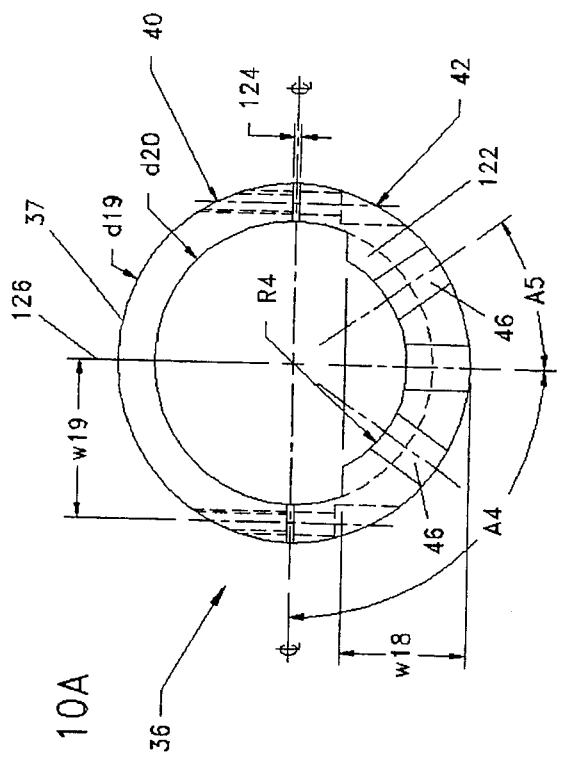
FIGS. 10 and 10A show the side and top views of the joined split portions of the castellated indexing collar, as shown exploded apart in FIG. 1.
Figure 10:
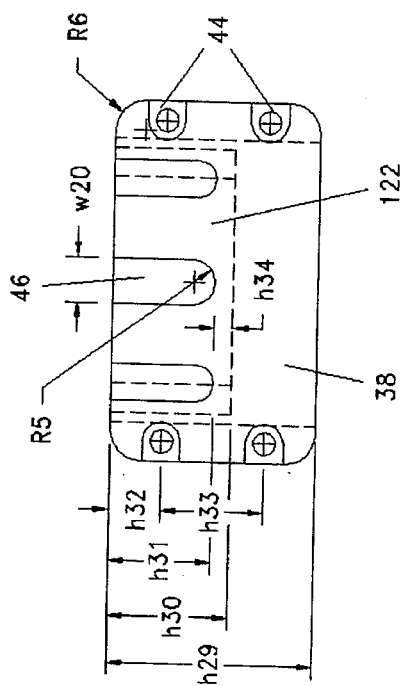

Referring now to FIGS. 10 and 10A, side and top views of the indexing collar 36 are shown, with the split halves 37 and 38 joined together via screws. The indexing collar 36 is preferably made from black Delrin or other suitable plastics. The collar is formed and machined as one piece, then tapped, and then sliced along centerline 124 using a 1/16 inch saw cut. The two-piece collar 36 can then be rejoined around the indexing pipe 12 as shown in FIG. 1. Other important features include the guide ledge 122 as formed along the back of front collar part 38. This semicircular ledge adds thickness to the indexing slots 46 for added strength and stability. This ledge extends downward a height h30 from the top of the collar 36, and a width w18 from the front. Ledge 122 is shaped so that it fits inside the aperture window 13 and guides the mounting of the collar in its proper position. Accordingly, the lower edge of ledge 122 butts against the lower edge of aperture 13 thus insuring proper interaction of the receiving slots 46 with the locking bar 31.

As embodied, the collar 36 has an outside diameter d19 and an inside diameter d20, and a height h29. Guide ledge 122 extends backwards and has rear surface radius of R4. As embodied, the collar 36 contains three receiving slots 46 of width w20 and depth h31, with each having a bottom radius R5. The bottom of each aperture 46 is approximately h34 above the lowermost part of the ledge 122. The front aperture is centered A4 degrees away from the centerline cuts 124. The other two apertures 46 are spaced at angles A5 on either side of the center aperture. The collar halves 37, 38 are joined via screws 44 which are spaced vertically h33 apart, and h32 from the top/bottom of the collar. Each pair of screw holes are composed of holes 40 in collar half 37 aligning with corresponding holes 42 in collar half 38. The longitudinal axis of such holes are located a width w19 on either side of the top central axis 126.

As before, the embodied invention is intended to include any such measurements as can be used to practice this invention by those skilled in the art. The embodiment shown for this part uses the measurements consisting of: h29=1.75 inches; h30=1.030 inches; h31=0.880 inches; h32=0.437 inches; h33=0.875 inches; h34=0.150 inches; d19=3 inches; d20=2.375 inches; w18=1.063 inches; w19=1.338 inches; w20=0.375 inches; R5=0.1875 inches; R6=¼ inches; A4=90 degrees; A5=35 degrees; with holes 40 being 0.194 inches in diameter, and holes 42 being counterbored 0.322 inches (such measurements include tolerances of +/−5 degrees for angles, +/−⅛ for fractions, +/−0.005 for three place decimals, and +/−0.020 for two place decimals).

As assembled, these parts provide a unique outrigger assembly with distinct advantages over the outriggers of the prior art. It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. A sport fishing outrigger assembly which facilitates precise indexing and nonslip positive locking without metal-on-metal contact of the position adjustment locking mechanism parts, said outrigger assembly comprising:

an indexing pipe with an upper and lower end, said pipe having a vertically elongated aperture window in its lower end;

an inner assembly having:
  (i) a cylindrical central pivot core with a flanged upper end and a flanged lower end and a centrally disposed cavity formed in said core's side,
  (ii) a plastic pivot bearing which is attached to said flanged lower end of said pivot core, and
  (iii) an extension tube which is weldably attached to said flanged upper end of said pivot core, said tube receiving a plastic bushing which slips over its top, whereby said inner assembly is inserted into said indexing pipe for rotational engagement so that said extension tube extends out the top of said indexing pipe, with said plastic bushing being fitted between said tube and said pipe at the top, and said plastic bearing being fitted between said core and said pipe at the bottom, said plastic parts thereby preventing metal-on-metal contact of said rotating parts;

a mounting bracket which is receivably mounted in said side cavity of said pivot core when said cavity is aligned for accessibility through said indexing pipe aperture window;

a handle locking engagement assembly with a handle and locking bar integrally attached thereto, wherein said assembly is pivotally mounted in said mounting bracket;

a indexing collar with a plurality of castellated aperture slots for receivably engaging said pivoting locking bar.

2. The sport fishing outrigger assembly of claim 1, wherein said indexing collar is comprised of a front half and a back half which are joined together around said indexing pipe.

3. The sport fishing outrigger assembly of claim 2, wherein said front half of said collar includes a front side and a back side, with a guide ledge extending from said back side for interfacably aligning said collar with said aperture window.

4. The sport fishing outrigger assembly of claim 2, wherein said halves include screw holes which are correspondingly aligned and joined by screws.

5. The sport fishing outrigger assembly of claim 1, wherein said handle locking engagement assembly includes an aluminum handle with an end proximal and distal to the user's hand, said distal end including a cavity for weldably receiving an aluminum locking bar.

6. The sport fishing outrigger assembly of claim 5, wherein said locking bar includes a through hole for pivotally mounting said handle locking engagement assembly in said mounting bracket, and said bar is shaped to securely engage said aperture slots when pivoted into locking downward position.

7. The sport fishing outrigger assembly of claim 6, wherein a surface of said locking bar interferably interacts with said mounting bracket to provide frictional resistance when locked.

8. The sport fishing outrigger assembly of claim 2, wherein said front collar half includes three vertically oriented aperture slots.

9. The sport fishing outrigger assembly of claim 1, wherein said mounting bracket includes a central rectangular cavity bounded by an upper wall and a mounting wall, said mounting wall having a pair of through holes for mounting said bracket to said central pivot core.

10. The sport fishing outrigger assembly of claim 1, wherein said assembly includes a pipe adaptor mount weldably attached to said lower end of said indexing pipe.

11. The sport fishing outrigger assembly of claim 1, wherein said collar is made from Delrin.

12. The sport fishing outrigger assembly of claim 1, wherein said mounting bracket is made from durable plastic.

13. The sport fishing outrigger assembly of claim 1, wherein said extension tube, central pivot core, and handle locking engagement assembly are made from aluminum.

14. The sport fishing outrigger assembly of claim 1, wherein said extension tube and central pivot core are made from aluminum and said handle locking engagement assembly is made from stainless steel.

15. A sport fishing outrigger assembly with a position adjustment locking mechanism for arresting motion of a rotationally deployable boom, said position adjustment locking mechanism comprised of a non-metal indexing collar with a plurality of vertically oriented castellated aperture slots, said collar being fixably attached to an indexing tube, said tube rotatably containing a boom holding assembly with a handle locking engagement assembly for downward engagement with said aperture slots, a first plastic bushing located along a top end of said indexing tube, a second plastic bushing locating along a bottom end of said boom assembly, said bushings isolating said boom assembly from said indexing tube, said aperture slots located along an upper portion of said collar positioned to limit handle engagement to said second plastic bushing.

16. The sport fishing outrigger assembly with a position adjustment locking mechanism of claim 15, wherein said indexing collar is split into two halves which are joined around said indexing tube via screws.

17. The sport fishing outrigger assembly with a position adjustment locking mechanism of claim 15, wherein said indexing collar is made from Delrin.

18. The sport fishing outrigger assembly with a position adjustment locking mechanism of claim 15, wherein said handle locking engagement assembly includes an aluminum handle with an end proximal and distal to the user's hand, said distal end including a cavity for weldably receiving an aluminum locking bar.

19. The sport fishing outrigger assembly with a position adjustment locking mechanism of claim 18, wherein said locking bar includes a through hole for pivotally mounting said handle locking engagement assembly onto said boom holding assembly, said bar being shaped to securely engage said aperture slots when pivoted downward into locking position.

* * * * *